United States Patent [19]

Bartley et al.

[11] 4,031,940

[45] June 28, 1977

[54] PNEUMATIC TIRE

[75] Inventors: Donald R. Bartley, Cuyahoga Falls; Robert F. Jones, Westfield Center, both of Ohio

[73] Assignee: The B. F. Goodrich Company, Akron, Ohio

[22] Filed: Feb. 21, 1975

[21] Appl. No.: 551,769

[52] U.S. Cl. .................... 152/362 R; 152/388; 152/399

[51] Int. Cl.² ..................................... B60C 15/00

[58] Field of Search .......... 152/362, 375, 379, 380, 152/381, 382, 383, 386–401

[56] References Cited

UNITED STATES PATENTS

| | | | |
|---|---|---|---|
| 780,209 | 1/1905 | Lude | 152/399 |
| 1,919,911 | 7/1933 | Shoemaker | 152/399 |
| 2,424,918 | 7/1947 | Brown | 152/401 |
| 2,822,017 | 2/1958 | Herzega | 152/362 R |
| 3,172,447 | 3/1965 | Johnson | 152/397 |

*Primary Examiner*—Robert B. Reeves
*Assistant Examiner*—Francis J. Bartuska
*Attorney, Agent, or Firm*—Harry F. Pepper, Jr.; W. A. Shira, Jr.

[57] ABSTRACT

A pneumatic tire is adapted for combination with an internally situated device, such as an emergency support member. The tire has at least one specially constructed bead portion which includes a conventional bead core or member and an additional bead member spaced axially inwardly therefrom. In the space between the two bead members is formed an anchoring channel contoured to tightly receive an anchoring means provided on the device to be situated internally of the tire.

4 Claims, 3 Drawing Figures

PNEUMATIC TIRE

BACKGROUND

This invention relates to pneumatic tires and in particular to pneumatic tires provided with various internal devices.

Pneumatic tires are often used in combination with structures or devices situated or disposed internally of the tire for various purposes. For example, recent emphasis on automotive safety has fostered developments of pneumatic tires which employ internal members adapted to support or limit the deflection of the tire for emergency operation while in a deflated condition. Exemplary of such developments are disclosed in U.S. Pat. Nos. 3,064,704; 3,610,308; 3,638,701 and 3,814,158.

Also, tires have been provided with internally disposed devices which function to lubricate the interior of a pneumatic tire for emergency use while deflated thereby or to reduce the tendency of the deflated tire to pull or break away from its rim.

Pneumatic tires have been provided with internal structures or devices which are operable to partially reinflate and/or reseal a tire so as to permit emergency use in the event of a sudden deflation of the tire. Also, devices may be used internally of a pneumatic tire to sense and indicate or warn of the presence of an abnormal pressure or temperature within the tire. Tire-internal member or device combinations for whatever purpose, often present difficult manufacturing, assembly and mounting problems. Typically, an internal member or device is securably joined to the tire, the rim upon which the tire is mounted, or both. This securement is usually effected by some mechanical means, adhesives or bonding.

How this member is secured as well as what it is secured to (i.e. the tire, rim or both) often times influences the contour, dimensions, or material of the internal member, and, many times, makes mounting of a tire-safety member combination to a rim a tedious and time consuming multi-step operation. Furthermore, repair or replacement of damaged internal members is often difficult because of the manner in which the members are combined with the tire and/or rim.

SUMMARY

It is an object of the present invention to provide a pneumatic tire adapted to be combined with an internal member or device in a simple manner.

It is another object of the present invention to provide a pneumatic tire which is combinable with an internal device for easy mounting on a rim.

It is yet another object of the present invention to provide a pneumatic tire with an internal member, combined in a manner which does not substantially influence the design of the safety member.

These and other objects, which will become more evident from the following description, are achieved by a pneumatic tire provided with means to anchor an internal member wherein at least one of the bead portions of the tire is provided with a pair of spaced bead members or cores separated by an arcuate anchoring channel or groove. The anchoring channel is contoured to receive an anchoring means associated with the internal member thereby securing or anchoring the member to the tire.

BRIEF DESCRIPTION OF THE DRAWINGS

The accompanying drawings illustrate the invention according to presently preferred embodiments in which.

DETAILED DESCRIPTION

Figure 1:
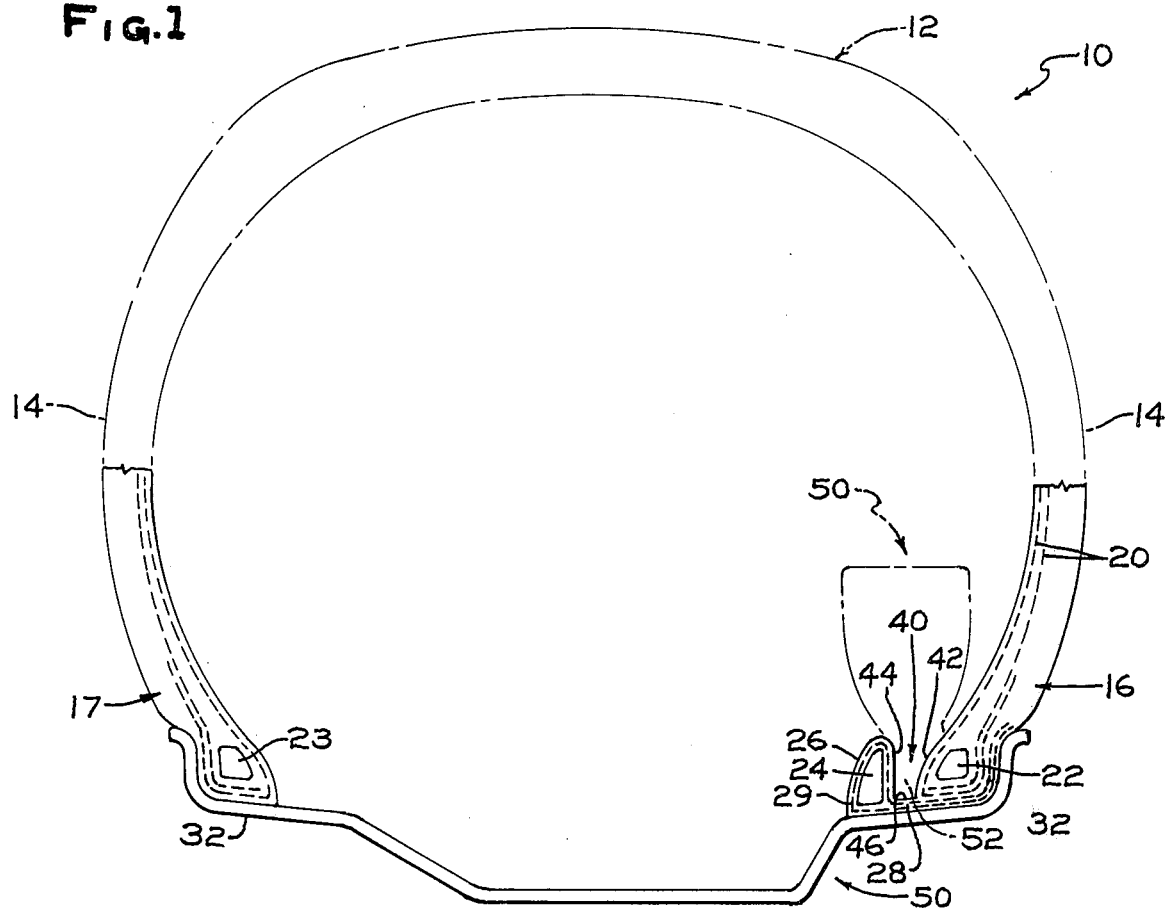
FIG. 1 is a cross-section of a pneumatic tire along the axis of rotation with an internal device, shown in outline, anchored to the tire in the vicinity of a bead portion thereof.

In FIG. 1, a pneumatic tire 10 includes an annular tread portion 12, joined by a pair of axially spaced, annular sidewalls 14, which extend radially inwardly to a pair of axially spaced, annular bead portions 16 and 17. The tire 10 includes typical reinforcement or carcass members 20 extending from bead portions 16 and 17 along sidewall portions 14 and across the tread portion 12. Additional circumferentially disposed belt or breaker members (not shown) may be provided within the tread portion area of the tire. Further structural details of the tread, sidewall and carcass portions of tire 10 are not important for purposes of this invention and the construction of these portions may vary, as desired, without affecting the scope of the invention.

As seen in FIG. 1, each bead portion 16 and 17 includes a circular bead member or core 22 and 23, respectively, around which are wrapped or "tied" the marginal edges of carcass members 20. The bead members may be partially enclosed by additional reinforcement fabric pieces called "flippers" (not shown). The bead cores 22 are typically constructed of suitable materials so as to provide stiffness and inextensibility to the bead portions 16 in order that the tire 10 can be effectively sealed and secured to a typical rim 30 at flanges 32 thereof.

According to an embodiment of the present invention, the bead portion 16 in FIG. 1 is shown as provided with an additional circular bead member or core 24, spaced axially inwardly of bead member 22. Bead member 24 is also constructed of suitable materials which preferably render it at least as stiff and inextensible as bead members 22 and 23. Preferably bead member 24 is surrounded by a layer of vulcanized elastomeric material integrally joined to similarly surrounded bead member 22 through an elastomeric extension or juncture portion 28. The layer of elastomeric material including juncture portion 28 may be reinforced with flipper type reinforcement such as 29 which extends from bead member 24, across portion 28, under and around bead member 22.

The additional bead member 24 is shown to be of different cross-sectional profile than bead member 22, and, in particular, is greater in height than member 22. This is principally because of the particular rim design shown which slopes radially inwardly from flange 32. The difference in profiles of bead members 22 and 24 results in the tops or radial outermost portions of beads 22 and 24 being substantially equal distances from the rotational axis. It is understood, therefore, that depending on factors such as rim design, beads members 22 and 24 may be of similar or distinctive cross-sectional profiles.

As further seen in FIG. 1, an arcuate anchoring channel 40 is formed between bead members 24 and 22 in bead portion 16. Preferably the arcuate channel 40 is annular, but may be, one of a series of annularly spaced channels, if desired. To form arcuate channel 40 annular is believed desirable to simplify tire fabrication as well as securement of an internal device to the tire.

The anchoring channel 40 is defined, as seen in FIG. 1, by an arcuate axially outer, elastomeric wall 42 along the axially inner side of bead member 22; an arcuate, axially inner, elastomeric wall 44 along the axially outer side of bead member 24; and an arcuate elastomeric, bottom surface 46 formed by the radially outer surface of elastomeric extension or juncture portion 28. The channel 40 is preferably formed in the tire during vulcanization and can be so formed, for example, by using a specially contoured rigid, shaping ring strategically located within the tire curing and shaping mold. Such a shaping ring can be composed of metal, hard rubber or any other material found suitably stiff or rigid for this purpose.

The channel 40 is contoured to receive an anchoring portion 52 of an internal device 50, shown in outline in FIG. 1. The device 50 is generally the outline of a typical internal safety member used to support or limit the deflection of the tire 10 for emergency operation while in a deflated state or condition. It is understood that the device 50 as shown in the drawings is for purposes of explanation and the invention is not limited in any way to the type, size or function of an internal device to be used.

Figure 2:
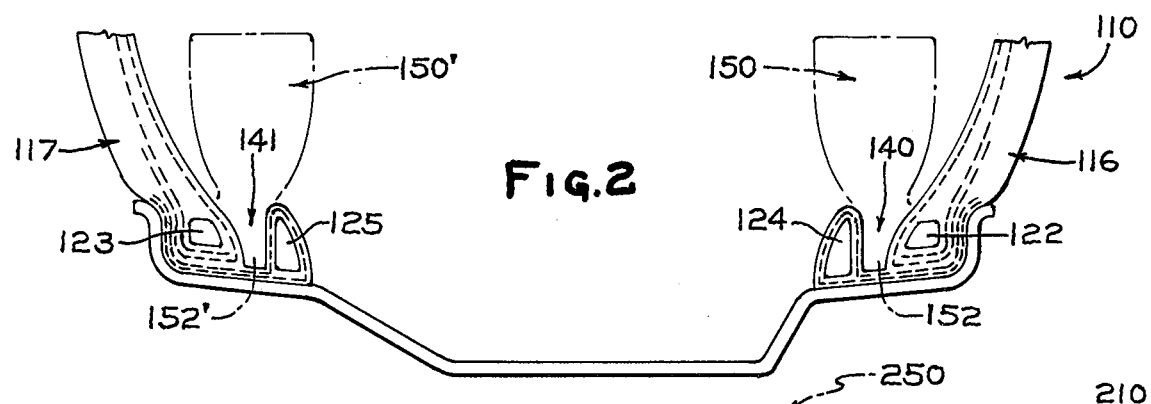
FIG. 2 is a partial cross-section of a pneumatic tire showing an internal device, in outline, anchored to each of the two bread portions of the tire.

In FIG. 2, a modification is shown where two internal devices 150 and 150' are secured to a tire 110. The tire 110 includes two axially spaced bead portions 116 an 117, each including a bead core or member 122 and 124, respectively. Bead members 122 and 123 each have spaced therefrom an additional bead member 124 and 125 respectively. Between members 124 and 122 is an anchoring channel 140 and between bead members 125 and 123 is an anchoring channel 141. The anchoring channels 140 and 141 and the respective bead members defining same are similarly constructed to channel 40 and its respective bead members 22 and 24 in FIG. 1. An anchoring means 152 forming a portion of internal device 150 fits tightly within channel 140, while anchoring means 152' forming a portion of internal device 150' fits tightly within anchoring channel 141.

Figure 3:
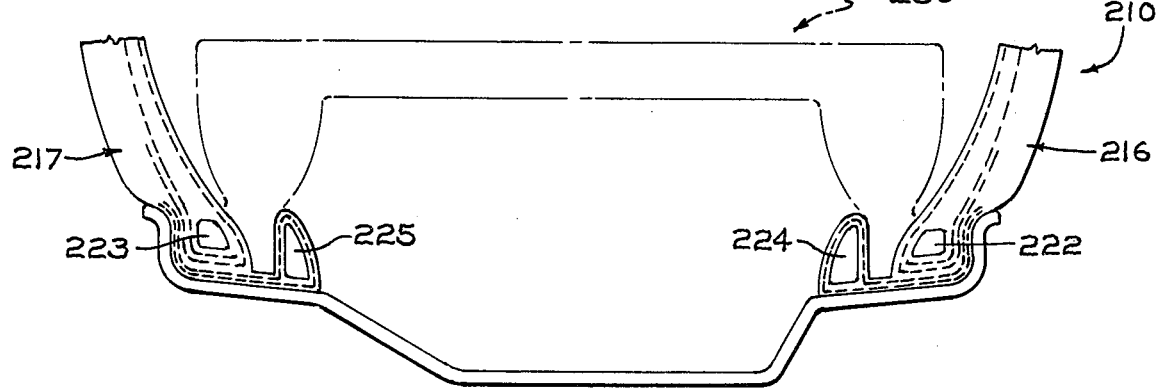
FIG. 3 is a partial cross-section of a pneumatic tire showing an internal member, in outline, anchored to both bead portions of the tire.

In FIG. 3, another modification is shown where an internal device 250 extends between bead portions 216 and 217 of a tire 210. Bead portions 216 and 217 each include a pair of bead members 222, 224 and 22, 225, respectively. Anchoring channels 240 and 241 tightly secure anchoring means 252 and 252' respectively each forming a portion of internal device 250.

The foregoing describes the invention in accordance with several presently preferred embodiments. It is understood, however, that other embodiments of the invention are possible without departing from the intended scope of the present invention, that scope to be measured by the appended claims.

What is claimed is:

1. In a pneumatic tire adapted for combination with an emergency use device with an anchoring means therewith for disposing said device internally of the tire, which tire includes a pair of axially spaced annular bead portions, the improvement wherein the tire comprises
    A. a pair of axially spaced, inextensible, circular bead members embedded within one of the bead portions, and
    B. an arcuate, anchoring channel for mounting the device within the tire, said anchoring channel being
        1. formed in the one bead portion,
        2. located between the bead members and
        3. contoured to receive the anchoring means of the device.

2. The structure defined in claim 1, wherein the anchoring channel is annular.

3. The structure defined in claim 1 further comprising:
    C. a second pair of axially spaced, rigid, circular bead members embedded within the other of the bead portions;
    D. a second, arcuate, anchoring channel for mounting the device within the tire, said anchoring channel being
        1. formed in the other of the bead portions,
        2. located between the second pair of bead members and
        3. contoured to receive the anchoring means of the device.

4. The structure defined in claim 3 wherein both anchoring channels are annular.

* * * * *